United States Patent Office 3,252,944
Patented May 24, 1966

3,252,944
URETHANE COATING COMPOSITION FOR ELECTRICAL CONDUCTORS AND METHOD
Ralph J. Curtis, Berkley, Mich., assignor to General Motors Corporation, Detroit, Mich., a corporation of Delaware
No Drawing. Filed Aug. 27, 1962, Ser. No. 219,716
7 Claims. (Cl. 260—77.5)

This invention relates to improved polymeric coatings for electrical conductors such as magnet wires and the like and to a method for the application of the coatings, and is a continuation-in-part of the patent application Serial No. 152,024, filed November 13, 1961, in the name of Ralph J. Curtis and assigned to the assignee of the present invention.

Insofar as it is known in the prior art, polyurethane-type electrical wire coatings or enamels as they are often called are applied to the wire from coating baths including polyesters having a relatively high molecular weight in the vicinity of 2000 to 4000 and having a large number of hydroxyl groups so that upon reaction with an organic polyisocyanate compound a highly cross-linked film or coating is formed containing both ester and urethane linkages. The polyester ingredient is a relatively viscous material which will react with an organic polyisocyanate when suitably admixed with catalysts. The preparation of these prior art coatings involves considerable cost in terms of processing equipment, labor and materials.

It is an object of this invention to provide a urethane type electrical wire coating which is more economical than those of the prior art and has improved physical properties. It is a further object of this invention to provide an improved electrical wire coating having urethane linkages only which is the reaction product of a diol, a triol and an organic polyisocyanate. An important object of the invention is a coating composition for applying the coatings to the surface of electrical conductors and the like consisting of a solvent solution of monomeric precursor compounds including a blocked organic polyisocyanate and preferably a diol and a triol.

In general these and other objects are accomplished by first preparing a non-resinous low molecular weight film-forming mixture consisting of a diol which preferably contains an aromatic structure and has its hydroxyl groups attached to an aliphatic chain no greater than two carbon atoms in length, such as bis-(2-hydroxyethyl) ether of hydroquinone; a triol having no hydrogen atoms on the carbon atom attached to the carbonol group such as trimethylolpropane; a blocked organic diisocyanate such as blocked diphenylmethane 4,4' diisocyanate in a solvent solution; and a suitable catalyst preferably a metallic organic compound or salt soluble in the solvent solution. In the coating process the wire to be coated is dipped in the solution and then transferred to a curing oven. The catalyst selected is one of the type described which will preferably promote the gelation of the coating within a period of about 25 seconds. Further objects and advantages of the invention will become apparent from the following detailed description wherein preferred embodiments of the invention are given by way of illustration.

The coating composition of this invention involves a simple mixture of non-polymeric substances which are readily applied to a wire from a solvent solution by standard well known procedures and which on curing produces coatings having superior properties for electrical conductors such as heat shock, flexibility, thermoplastic flow, resistance to solvent action, heat aging, heat stability, solvent extraction and dielectric properties. In general, a coating bath in accordance with this invention consists of monomeric low molecular weight components and includes as essential constituents an organic diisocyanate compound, preferably an aromatic type such as diphenylmethane 4,4' diisocyanate; a diol containing an aromatic structure in which the hydroxyl groups are attached to aliphatic chains having no more than two carbons in length such as the bis-(2-hydroxyethyl) ether of hydroquinone; and a triol such as trimethylolpropane containing no hydrogen atoms on the carbon atom attached to the methylol (—COH) group.

A specific illustration of a bath composition in accordance with the invention is the following Example I:

| Component | Equiv. Weight | Equivalents Used |
|---|---|---|
| Diphenylmethane 4,4'-diisocyanate | 125 | 2.0 of isocyanate. |
| Trimethylolpropane (triol) | 44.7 | 1.0 of hydroxyl. |
| Bis-(2-hydroxyethyl) ether of hydroquinone | 99.1 | 1.0 of hydroxyl. |
| Lead oxide dissolved in cresylic acid (25% by weight lead). | | 0.05% by weight lead based on the solids content of the solution. |

The diphenylmethane 4,4' diisocyanate is first capped or reacted with a phenol, preferably cresylic acid, which renders it nonreactive at room temperature. Upon being heated to a temperature in the neighborhood of 300° C. the phenol splits off to produce the diphenylmethane 4,4' diisocyanate compound having free isocyanate groups. The isocyanate groups are then available for preferential reaction with the aliphatic hydroxyl groups of the triol and diol.

The coating solution is prepared by first dissolving the diphenylmethane 4,4' diisocyanate in a mixture of cresols (cresylic acid) and heating to about 212° C. to effect a blocking of the isocyanate compound and then cooling to about 140° F. to 160° F. The hydroxyl compounds are then added to the solution and dissolved therein by mixing and heating the solution to preferably not more than about 195° F. to effect solution of the materials while avoiding a possible premature polymerization reaction. The solution is then cooled to about 140° F., after which the catalyst compound is added while vigorously stirring the solution. The catalyst added is the reaction product of lead oxide in an excess of cresylic acid. A satisfactory catalyst involves a solution containing about 25% lead on a weight basis. To achieve optimum process working characteristics sufficient cresylic acid solvent is used to make up a coating solution containing about 30% solids. Satisfactory solutions may consist of 25% to 40% solids on a weight basis.

Coating of a wire is effected by dipping the wire into the coating solution to form adherence of a thin film of the liquid thereon. Thereafter the dipped wire is passed through a vertical furnace heated to a temperature of about 550° F. at the base thereof to about 650° F. at the top. The wire is passed at the rate of about 35 feet per minute through a 20 foot oven to effect a satisfactory cure of the coating. Satisfactory coatings may be obtained from coating compositions in which the triol component is present in the range of from about 0.75 to 1.25 hydroxyl equivalents and conversely in which the diol varies from about 1.25 to 0.75 hydroxyl equivalents.

Various pertinent properties for electrical conductor coating purposes have been determined and are tabulated below for the coating described in connection with Example I. These are compared with typical properties for polyester-polyurethane type electrical conductor coatings presently known in the prior art and available commercially.

| Property | Polyester-Urethane Typical Properties | Coating of Example I |
|---|---|---|
| Thermoplastic Flow Temperature, °F | 520 | 620. |
| Abrasion Resistance (Repeated scrape), Strokes. | 100 | 180. |
| Heat Shock (1.0 hour 3X) | 300° F | 350° F. |
| Toluene-Methanol Extractible, percent. | 1.3 | 0.3. |
| Solvent Resistance | Good | Excellent. |
| Heat Aging (168 hours at 284° F.) | Pass | Pass. |
| Wet Dielectric Strength | Good | Good. |
| Freon Resistance | Poor | Do. |

The thermoplastic flow test involved placing a coated wire and an uncoated wire in abutting and transverse relation to one another, applying a 14-pound weight thereto and connecting a six-volt signaling circuit across the wires. The wires were heated to produce a rise in the temperature of the wire of 3° F. per minute. The temperatures listed in the above tests are the temperatures at which a breakdown in the insulation is evident in the signal circuit. The remaining tests are the standard tests of the National Electrical Manufacturers Association. The abrasion resistance test was performed using a General Electric repeated scrape abrasion tester. The data is an average of three specimens in each test represented.

It will be noted that the coating of this invention is markedly superior to the typical commercial product in plastic flow, abrasion resistance, heat shock resistance, toluene-methanol extraction and solvent resistance properties. In addition the coating of the Example I has heat aging and wet dielectric properties which compare favorably with the coatings of the prior art.

Another illustration of an excellent coating composition in accordance with this invention is the following Example II:

| Component | Equiv. Weight | Equivalents Used |
|---|---|---|
| Diphenylmethane 4,4'-diisocyanate | 125.0 | 2.0 of isocyanate. |
| Trimethylolpropane (triol) | 44.7 | 1.0 of hydroxyl. |
| Bis-(2-hydroxyethyl) ester of terephthalic acid (diol). | 127.1 | 1.0 of hydroxyl. |
| Lead naphthenate dissolved in mineral spirits (24% lead by weight). | | 0.05% by weight lead based on solids content of coating bath. |

Satisfactory coatings may be obtained in compositions in which the triol is varied from about 0.75 to 1.25 hydroxyl equivalents and the diol is varied from 1.25 to 0.75 hydroxyl equivalents. In coatings of this type the total equivalents of hydroxyl groups in the diol and triol components must equal two in order to maintain the stoichiometric relationship with the organic polyisocyanate. Another illustration of a suitable formulation in accordance with this invention is the following Example III:

| Component | Equiv. Weight | Equivalents Used |
|---|---|---|
| Diphenylmethane 4,4'-diisocyanate | 125 | 2.0 of isocyanate. |
| Trimethylolpropane (triol) | 44.7 | 1.0 of hydroxyl. |
| Bis-(2-hydroxyethyl) ether of 2,2 (p-hydroxyphenyl) propane (diol). | 158 | 1.0 of hydroxyl. |
| Lead oxide dissolved in cresylic acid (25% by weight lead). | | 0.05% by weight lead based on the solids content of the solution. |

Other satisfactory three component systems as above described were made using neopentyl glycol and the bis-(2-hydroxypropyl) ether of 2,2 (p-hydroxyphenyl) propane as diols in the formulation shown above. Other compounds which may be used as the diisocyanate component to form similar three component systems include 3,3' dimethyl diphenylmethane 4,4' diisocyanate, 3,3' bitolylene 4,4' diisocyanate and dianisadine 4,4' diisocyanate. Other compounds such as trimethylolethane, glycerol and pentaerythritol may be used as the triol ingredient. Other diols which may be used include 1,4 (hydroxymethyl) benzene, 2,5 (hydroxymethyl) p-xylene, 1,4 dimethanol cyclohexane, bis-(2-hydroxyethyl) ester of terephthalic acid and bis-(2-hydroxyethyl) ester of isophthalic acid.

Valuable coatings have also been obtained from monomeric coating compositions consisting essentially of a solvent solution of a blocked organic polyisocyanate and certain monomeric diols. Bis-(2-hydroxyethyl) ether of hydroquinone, bis-(2-hydroxyethyl) ether of 2,2-(p-hydroxyphenyl) propane and bis-(2-hydroxyethyl) ester of terephthalate were each mixed with stoichiometric proportions of blocked diphenylmethane 4,4' diisocyanate in cresol solvent solution, applied to a substrate and cured. Each of these compositions gave clear, transparent films having a good toughness, hardness, adhesion and flexibility.

As indicated in the examples described above, a catalyst is preferably employed to accelerate the gelling and cure of the coating compositions after application thereof to the wire. It has been found that excellent gelling and cure rates are obtained when small quantities of certain metal-containing organic compounds soluble in the coating composition are added thereto. Below is set forth in tabular form a list of various metal-containing compounds which have been found suitable.

| Sample No. | Catalyst | Col. 1 Percent Metal in Sample | Col. 2 Gelatin Time (Sec.) | Col. 3 Comments |
|---|---|---|---|---|
| 1 | Lead Naphthenate (24% Pb) | 0.05 | 12.1 | Slight amber tint. Film clear. No bubbles or wrinkles. |
| 2 | Lead Oxide+Cresylic Acid (25% Pb). | 0.1 | 11.4 | Clear and medium amber in color. |
| 3 | Lead Naphthenate (24% Pb) | 0.1 | 12.2 | Medium amber color. No wrinkles or bubbles. Film clear. |
| 4 | do | 0.0125 | 13.5 | Same as Sample No. 1. |
| 5 | do | 0.33 | 10.7 | Medium dark amber color. No wrinkles or bubbles. Film clear. |
| 6 | do | 0.025 | 12.8 | Clear and slightly darker in color than sample No. 1. |
| 7 | Lead Phenolate (25% Pb) | 0.1 | 11.3 | Clear and medium amber in color. |
| 8 | Lead m-Cresolate (25% Pb) | 0.1 | 11.6 | Do. |
| 9 | Dibutyltin Dilaurate (18% Sn) | 0.02 | 23 | Very slight amber tint. Clear; no bubbles or wrinkles. |
| 10 | do | 0.1 | 15.2 | Medium amber tint. Clear; no bubbles or wrinkles. |
| 11 | Triphenyltin Oxide (33% Sn) | 0.1 | 19 | Clear and light color. |

The above results were obtained by adding the metal-containing organic compound in the indicated amounts to the formulation of Example I. The percentages expressed in the table are on a weight basis. Similar results were obtained with the formulations of Examples II and III. The quantity of the metal-containing compound added in each instance in column 1 is expressed as a percentage of the total solids content of the formulation on a weight basis. In each instance the solids content of the formulations was in the neighborhood of 30% on a weight basis.

The gelation time indicated in column 2 is the time in seconds required for the coating composition to harden. Each reading given is an average of at least three samples.

This gelation time was determined using the Fisher-Johns melting point apparatus by the following procedure. With the melting point apparatus operating at a temperature of 225° C. (±2°), a sample in the form of a drop about 3/16 inch in diameter is placed in the center of the cover glass using the pointed spatula. The cover glass is placed on the hot plate of the apparatus and the stopwatch is started at the same instant. While observing the sample through a 5× magnifier, the sample is quickly spread with the needle over the surface of the glass (circular area about 14 mm. in diameter) which is in direct contact with the hot surface. Stroking of the sample with the needle is continued and the end point is reached when the sample solidifies so the needle leaves a permanent mark as it is drawn across the surface of the glass. With the fast gelling samples (10–14 seconds) this change is abrupt while with samples showing gelation times greater than about 20 seconds a gradual increase in viscosity is noted and finally the needle leaves a rough path as the sample hardens. With samples that show a surface hardening or skinning effect the end point is taken as the time the liquid in contact with the glass hardens. Duplication of sample size is facilitated by the use of a template or pattern which consists of concentric circles 18 mm. (diameter of cover glass) and 3/16 inch in diameter. With the cover glass centered over the circles, a drop of sample on the tip of the spatula is touched to the center of the glass and by its own surface tension allowed to flow out over the 3/16 inch diameter area. With solutions of essentially the the same viscosity, duplication of sample size is not a difficult operation. The observed gelation time also depends on the thickness of the samples and it has been found that rapid and uniform spreading of the sample over the glass surface (14 mm. diameter area) is essential if reproducible results are to be obtained. The effects of small variations in sample size and degree of spreading may be nullified somewhat by running several tests (3–8) on each sample and recording the average as the gelation time. Noticeably large and small samples as well as poorly spread samples can be observed during the test and such data is not used.

As the above experiments indicate, satisfactory cures may be obtained using the various catalysts indicated in proportions from about 0.0125 to 0.33. Experimental evidence indicates that satisfactory cures may be obtained in the general range of 0.01% metal based on the solids content to about 0.5. The lead compounds including lead naphthenate, lead octoate, the reaction product of lead oxide and cresylic acid having gelation rates in the neighborhood of 10–14 seconds are the preferred catalysts. In contrast, the cure rate for these coating systems without the catalyst is in the neighborhood of 40 seconds or more. The reaction product of lead oxide and cresylic acid is especially desirable since it may be prepared separately and will form a stable solution.

Typical organic amine compounds such as triethylene diamine and diethylcyclohexylamine have been found ineffective in catalyzing the formulation of this invention.

Stannous compounds such as stannous octoate have been found to have a limited shelf-life and for this reason are undesirable. On the other hand, as the above examples indicate, stannic compounds, although less efficient than the lead compounds, provide improved gelation rates of between about 15 to 23 seconds.

While the embodiments of the present invention as disclosed herein constitute a preferred form, it is to be understood that other forms may be adopted without departing from the spirit of the invention.

I claim:

1. An electrical conductor coating bath comprising a solvent solution of two isocyanate equivalents of an organic diisocyanate containing an aromatic group, 1.25 to 0.75 hydroxyl equivalents of a diol having an aromatic structure in which the hydroxyl groups are attached to aliphatic chains not more than 2 carbons in length, 0.75 to 1.25 hydroxyl equivalents of a triol containing no hydrogen atoms on the carbon atom attached to the methylol group and a catalyst comprising a small but effective amount of a metal-containing organic compound soluble in said solvent solution taken from the group consisting of lead naphthenate, a lead phenolate, lead octoate, dibutyltin dilaurate and triphenyltin oxide.

2. An electrical conductor coating bath comprising a solvent solution of about two isocyanate equivalents of diphenylmethane 4,4' diisocyanate, 1.25 to 0.75 hydroxyl equivalents of bis-(2-hydroxyethyl) ether of hydroquinone, 0.75 to 1.25 hydroxyl equivalents of trimethylolpropane, and a catalyst comprising a small but effective amount of a metal-containing organic compound soluble in said solvent solution taken from the group consisting of lead naphthenate, a lead phenolate, lead octoate, dibutyltin dilaurate and triphenyltin oxide.

3. An electrical conductor coating bath comprising a cresylic acid solution of two isocyanate equivalents of an organic diisocyanate containing an aromatic group, 1.25 to 0.75 hydroxyl equivalents of a diol having an aromatic structure in which the hydroxyl groups are attached to aliphatic chains not more than 2 carbons in length, 0.75 to 1.25 hydroxyl equivalents of a triol containing no hydrogen atoms on the carbon atom attached to the methylol group, and a catalyst consisting of at least 0.01% metal by weight based on the solids content of said cresylic acid solution of a lead phenolate.

4. An electrical conductor coating bath comprising a solvent solution of about two isocyanate equivalents of diphenylmethane 4,4' diisocyanate, 1.25 to 0.75 hydroxyl equivalents of bis-(2-hydroxyethyl) ether of hydroquinone, 0.75 to 1.25 hydroxyl equivalents of trimethylolpropane and a catalyst consisting of at least 0.01% metal by weight based on the solids content of said solvent solution of a metal-containing organic compound taken from the group consisting of lead naphthenate, a lead phenolate, lead octoate, dibutyltin dilaurate and triphenyltin oxide.

5. A method of coating a metal article comprising the steps of providing a solvent solution of two isocyanate equivalents of a blocked diisocyanate containing an aromatic structure, two hydroxyl equivalents of a diol having an aromatic structure in which the hydroxyl groups are attached to aliphatic chains not more than two carbons in length, a small but effective amount of metal-containing organic compound soluble in said solvent solution taken from the group consisting of lead naphthenate, a lead phenolate, lead octoate, dibutyltin dilaurate and triphenyltin oxide, applying the mixture to a metal substrate in the form of a coating and heating the coating to a temperature and for a time sufficient to effect an activation of the blocked diisocyanate and a cure of the coating.

6. A method of coating an electrical conductor comprising the steps of providing in solvent solution two isocyanate equivalents of a blocked diisocyanate, 0.75 to 1.25 hydroxyl equivalents of a diol having an aromatic structure in which the hydroxyl groups are attached to aliphatic chains no more than two carbons in length, 0.75 to 1.25 hydroxyl equivalents of a triol containing no hydrogen atoms on the carbon atom attached to the methylol group and a small but effective amount of metal-containing organic compound soluble in said solvent solution taken from a group consisting of lead naphthenate, a lead phenolate, lead octoate, dibutyltin dilaurate and triphenyltin oxide, applying the mixture to the wire in the form of a thin coating and heating the coating to a temperature and for a time sufficient to cure the coating.

7. A method of coating an electrical conductor comprising the steps of providing a solvent solution of two isocyanate equivalents of a blocked aromatic diisocyanate, 0.75 to 1.25 hydroxyl equivalents of a diol having an aromatic structure in which the hydroxyl groups are attached to aliphatic chains not more than two carbons in length, 0.25 to 1.25 hydroxyl equivalents of a triol containing no hydrogen atoms on the carbon atom attached to the methylol group and about 0.01 to about 0.33 percent metal by weight based on the solvents content of the solvent solution of a metal-containing organic compound selected from the group consisting of lead naphthenate, a lead phenolate, lead octoate, dibutyltin dilaurate and triphenyltin oxide, applying the mixture to the wire in the form of a thin coating and heating the coating to a temperature and for a time sufficient to effect a cure of the coating.

References Cited by the Examiner
UNITED STATES PATENTS

| | | | |
|---|---|---|---|
| 2,333,922 | 11/1943 | Foster | 117—232 |
| 2,910,381 | 10/1958 | Vogel | 260—75 |
| 3,001,971 | 9/1961 | Scott et al. | 260—75 |
| 3,012,993 | 12/1961 | Rogan | 260—77.5 |
| 3,036,022 | 5/1962 | Stewart et al. | 260—77.5 |
| 3,039,976 | 6/1962 | Barnes et al. | 260—77.5 |
| 3,044,971 | 7/1962 | Polis | 260—77.5 |
| 3,060,137 | 10/1962 | Gemeinhardt et al. | 260—77.5 |
| 3,067,063 | 12/1962 | Hall et al. | 117—232 |
| 3,067,150 | 12/1962 | Dumbrow et al. | 260—77.5 |
| 3,072,597 | 1/1963 | Lavin et al. | 117—232 |
| 3,084,177 | 4/1963 | Hostettler et al. | 117—77.5 |
| 3,084,182 | 4/1963 | McElroy | 117—232 |

RICHARD D. NEVIUS, *Primary Examiner.*

W. L. JARVIS, *Assistant Examiner.*